United States Patent

Smith

[15] 3,651,985

[45] Mar. 28, 1972

[54] FEEDER CONTROL AND METHOD

[72] Inventor: Floyd E. Smith, 5704 Brewster Lane, Erie, Pa. 16505

[22] Filed: Dec. 7, 1970

[21] Appl. No.: 95,473

[52] U.S. Cl. ................................................221/10, 198/37
[51] Int. Cl. ....................................G07f 11/00, B65g 43/08
[58] Field of Search ..........................198/82, 37; 221/10, 13

[56] References Cited

UNITED STATES PATENTS

| | | | |
|---|---|---|---|
| 3,512,662 | 5/1970 | Strydom | 198/37 |
| 2,902,186 | 9/1959 | Pollmann | 221/10 |

FOREIGN PATENTS OR APPLICATIONS

| | | | |
|---|---|---|---|
| 1,033,281 | 6/1966 | Great Britain | 198/37 |

*Primary Examiner*—Evon C. Blunk
*Assistant Examiner*—H. S. Lane
*Attorney*—Dominik, Knechtel & Godula

[57] ABSTRACT

A feeder is disclosed in which a supply feeder delivers frangible parts to a linear feeder. The control is achieved by slaving the supply feeder to the linear feeder, and controlling the number of parts on the linear feeder as a master with the supply feeder as slave. An interrupted beam control is positioned to determine the infeed from the supply feeder to the linear feeder, the linear feeder being controlled by another beam interruption control at its delivering end. The parts are delivered to a finite position, illustrated for pick up by a conveyor having a plurality of buckets on a chain. The control shuts off the slave supply feeder upon a predetermined time delay after parts pass through the beam. The supply feeder is then activated again after the parts blockage is removed. For purposes of illustration, the supply feeder is a vibratory bowl feeder and the linear feeder is a vibratory linear feeder.

The method contemplates feeding the parts to the linear feeder from the slave supply feeder shutting the same off upon a predetermined time delay after a signal. The signal is a function of continuous parts blockage of a sensor, which is reactivated responsive to the absence of parts blockage, the method of controlling the linear feeder being solely the function of positioning of parts at its delivery end.

10 Claims, 5 Drawing Figures

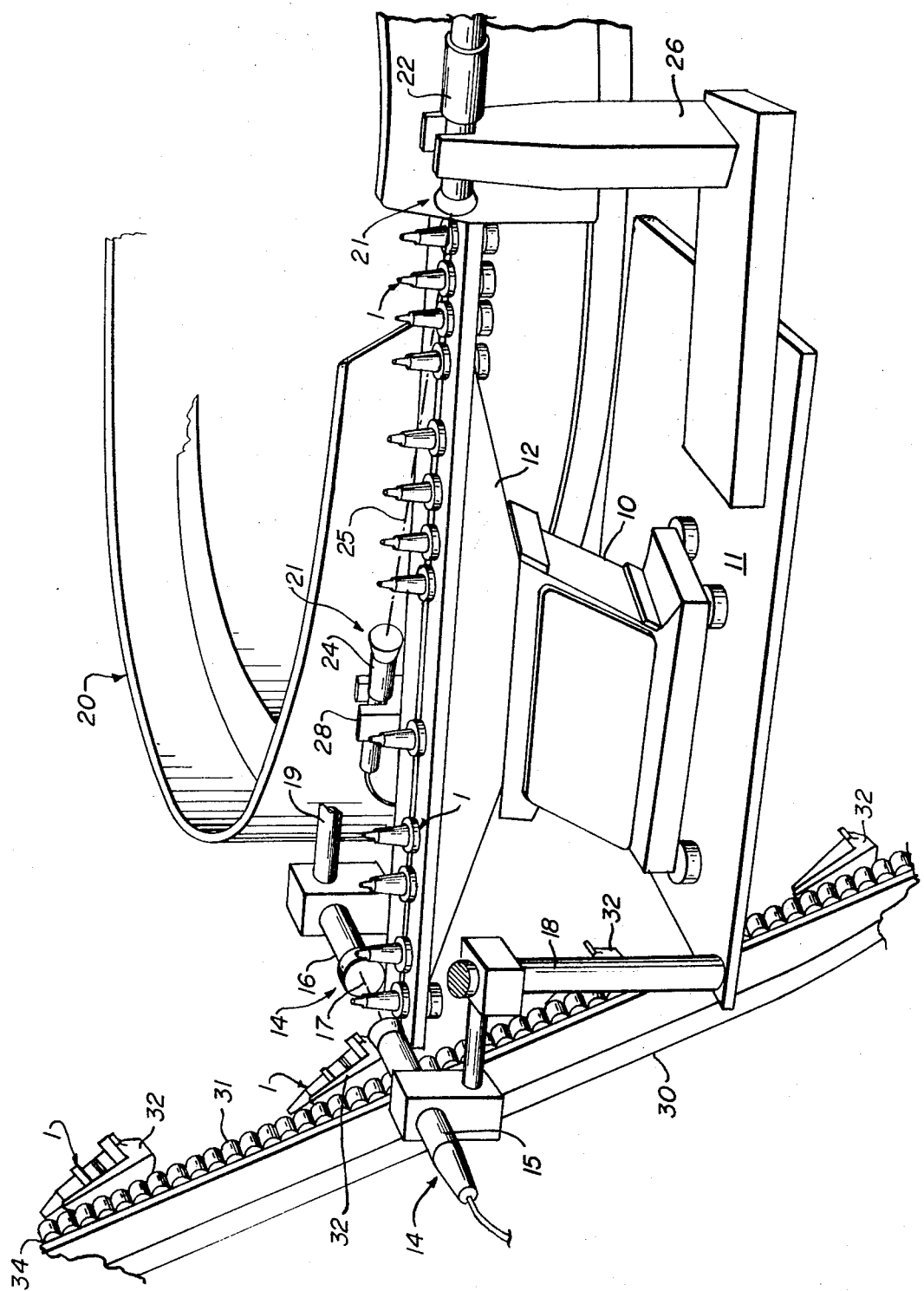

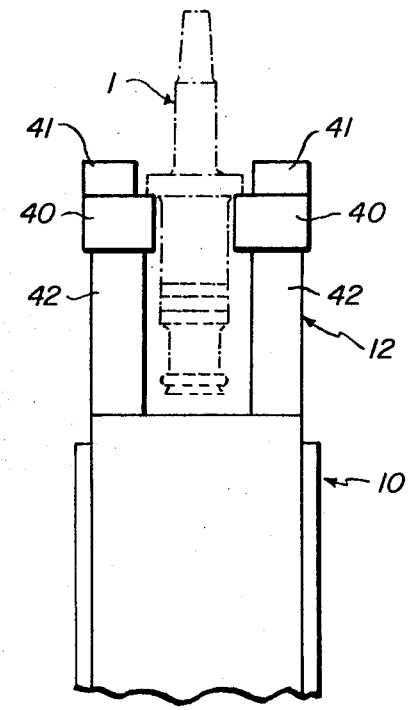
FIG. 4
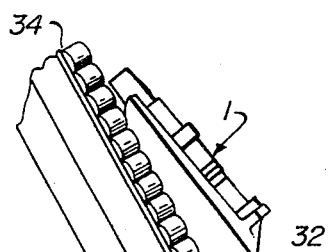
FIG. 2
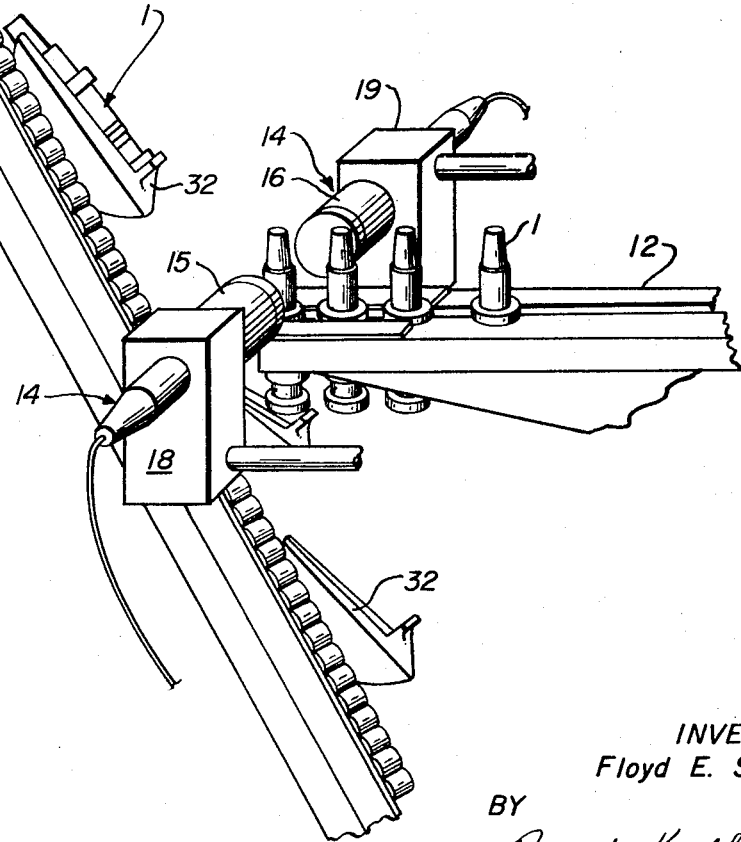
INVENTOR
Floyd E. Smith
BY
Dominik, Knechtel & Godula
ATTYS.

INVENTOR
Floyd E. Smith
BY
Dominik, Knechtel & Godula
ATTYS.

INVENTOR
Floyd E. Smith

FEEDER CONTROL AND METHOD

BACKGROUND OF INVENTION

The background of the present invention as illustrated is shown in the feeding of frangible type parts and more particularly spark plug porcelains. Such parts, particularly when fed by a vibratory bowl feeder, cannot be permitted to tumble back into the bowl. Additionally, when the linear feeder is a vibratory linear feeder, the parts should not be permitted to bump one into the other and jam as this can cause breakage. When delivered to a conveyor or pick-off device, the same should be positioned for immediate removal without tangling with other parts on the track.

More particularly, where porcelain parts of this type are involved, the atmosphere in the manufacturing center is often dirty, dusty, or otherwise contaminated making it difficult to use photoelectric cells which will have to be continuously cleaned.

Bowl feeders of the vibratory type are well known, and any such bowl feeder may be used in the combination. Also centrifugal, rotary hopper, and other supply feeders may be used. The linear feeder illustrated is of the character shown in Otto K. Schwenzfeier U.S. Pat. No. 3,322,260. Conveyor type linear feeders may also be employed. In the attempts of the prior art to feed porcelains to the rubber buckets of the character described above, an overdriving by the bowl to the linear feeder has resulted in breakage and jamming. When an attempt was made to starve the linear feeder, often times one in 10 of the buckets intended to feed the spark plug porcelains were empty.

STATEMENT OF INVENTION

The invention stems from the discovery that by using infrared sensing devices, and feeding the parts to a linear feeder from a slaved supply feeder, that adequate spacing can be maintained between the frangible parts and yet a feed rate programmed which is compatible with varying quantities of porcelains within the supply feeder, and filling all of the pick-off devices. The control system shuts off the slaved supply feeder upon a predetermined time delay after a signal. The signal, of course, is a function of a part being present and blocking one of the sensors, the sensor controlling the slaved supply feeder. The supply feeder remains off as long as a continuous parts blockage takes place. The slaved supply feeder is then reactivated responsive to the absence of a parts blockage on the sensor indicating that a further supply of parts is required by the linear feeder. The far end of the linear feeder, the delivery portion, has a second sensing device and the linear feeder is deactivated whenever a part is present, and activated as soon as that part is removed. Both the method and the control system rely upon the above sequence, and are enhanced by the utilization of infrared sensing devices rather than photoelectric cells since the infrared sensing devices are not deactivated by the presence of dust on any lenses. Other sensing devices including pneumatic and capacitance change sensors are contemplated.

One e of the principal objects of the present invention is to feed frangible parts such as spark plug porcelains from a varying supply feeder without jamming or damage.

A further and related object of the present invention is to control such feeding in a manner that does not require constant maintenance, but rather can run an entire shift with little or no assistance apart from keeping the supply feeder full.

Still another and more specific object of the present invention is to provide a combination of vibratory bowl feeder and vibratory linear feeder in which the parts would uniformly be presented to a pick-off at the far end of the linear feeder track without interruption and jamming.

A further object of the present invention is to provide a feeder control and method for frangible parts of the character just discussed in which the bulk of the elements making up the feeder are standard available parts such as a vibratory bowl feeder, and an infrared blockage interruption sensing device thereby holding the overall cost of the feeder control and method to a minimum due to the number of stock items employed.

Still another object of the present invention is to provide a feeder control which compensates for wide variances in the feed rate in a slaved supply feeder as well as the quantities of parts being fed.

DESCRIPTIONS OF DRAWINGS

Further objects and advantages of the present invention will become apparent as the following description of an illustrative embodiment proceeds taken in conjunction with the accompanying drawings in which:

FIG. 1 is a perspective partially broken view illustrating the relationship between the supply feeder, linear feeder, two sensing assemblies, and a pick-off conveyor.

FIG. 2 is an enlarged partially broken perspective view of the delivery end of the linear feeder shown in FIG. 1.

FIG. 4 is a front elevation of the pick-off end of the linear feeder showing a typical part in place for pick-off.

DESCRIPTION OF PREFERRED EMBODIMENT

Figure 3:
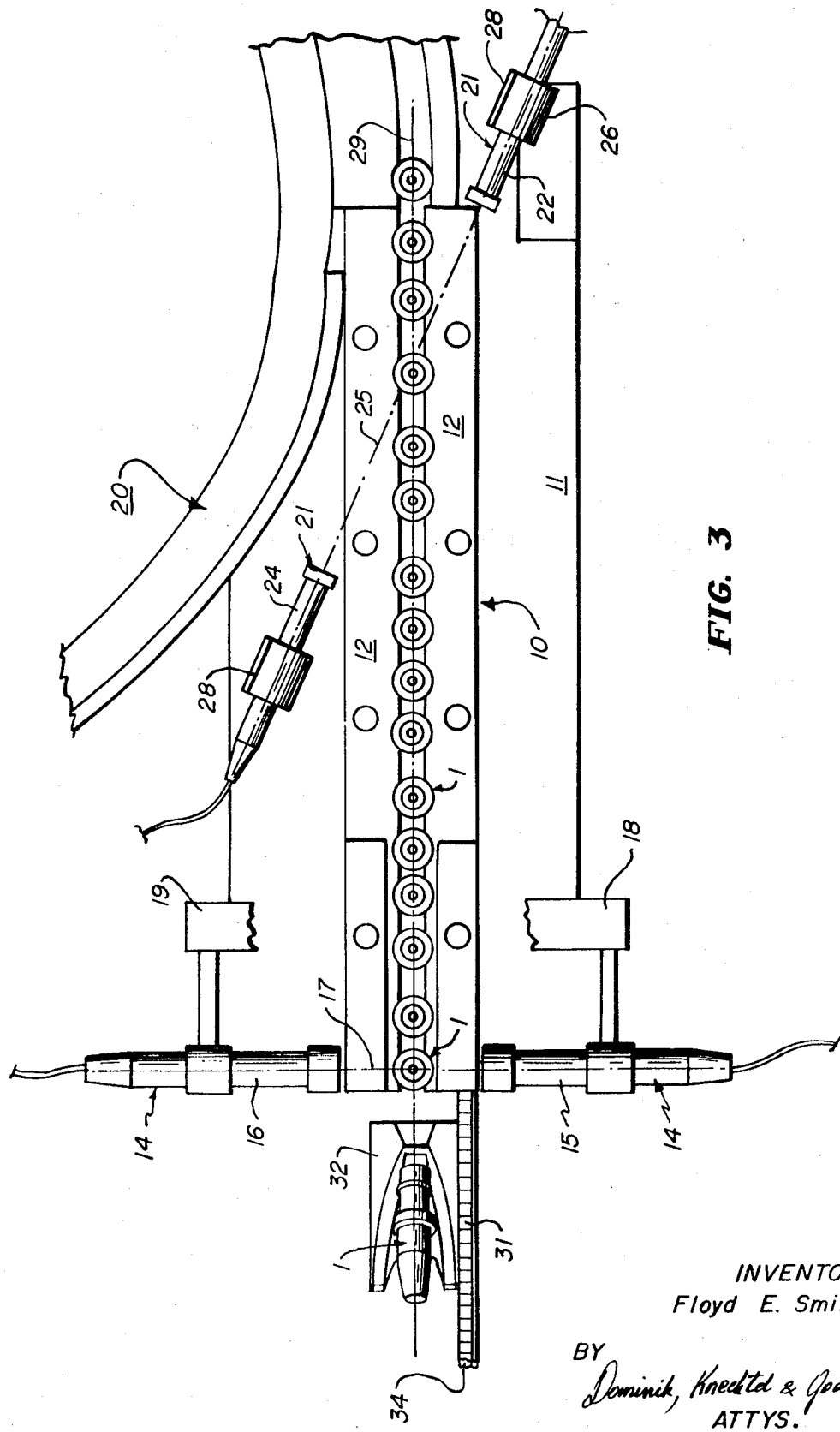
FIG. 3 is a plan top view of the linear feeder track, its relationship with the supply feeder, and specifically showing the axes of the sensor beams.

Referring now to FIG. 1, the general assembly, it will be seen that the porcelain parts 1 are fed by means of a linear feeder 10 and its associated track 12 which are mounted atop a base 11 to a conveyor 30. The conveyor 30 has a chain 31 which rides on the conveyor rail 34 and has a plurality of rubber buckets 32 which receive the porcelain parts 1. The parts are fed from the supply feeder 20 onto the linear feeder track 12.

The linear feeder 10 is the master, and the supply feeder 20 is the slave. The linear feeder 10 is controlled by means of an infrared beam interruption control or linear sensor 14. The sensor is made up of the outer sensor 15 and the inner sensor 16, one of which is a black box infrared emitting source, and the other an infrared detector such as exemplified by U.S. Pat. No. 3,411,005. The detector is programmed to sense the presence or absence of a part 1 on the track 12 of the linear feeder 10. The in-line linear feeder sensor 14 is programmed to activate the linear feeder 10 when the part 1 is absent from the end of the track 12, and deactivate the linear feeder 10 when a part 1 is present at the end of the track 12. There is no time delay, or other detail of adjustment required of the linear sensor assembly 14 than to position the part 1 at the absolute end of the track 12 so that the buckets 32 on the conveyor assembly 30 will pick the part off of the end of the linear feeder each time the bucket passes the end of the linear feeder track 12.

As will be seen in FIG. 3, the linear feeder sensor 14 with its outer sensor 15 and inner sensor 16 emits a beam 17 which, as shown, is interrupted by the center line of the porcelain part 1. The sensors 15 and 16 are supported on the base 11 by means of the outer sensor support 18 and the inner sensor support 19, the construction of which may be varied in accordance with the spaced relationship surrounding the assembly.

Referring now particularly to FIG. 3 it will be seen that the supply feeder beam 5 extends between the supply feeder sensor 21 elements which are a rear sensor 22 and a front sensor 24. The supply feeder sensor beam 25 is positioned at an angle so that slight gaps between the parts 1 will appear as a solid line, therefore rendering the supply feeder sensor assembly 21 less susceptible to hunting which will occur when some parts are slightly spaced, particularly since the parts 1 as shown have varying cross-sections. The rear sensor support 26 and front sensor support 28 have slightly different configurations than those shown for the linear feeder outer sensor support 18 and inner sensor support 19 based upon the particular arrangement involved.

Referring now to FIG. 4 it will be seen that the linear feeder 10, and more particularly its track 12, are made up of track rails 40 which are adjustable as to width as to accommodate varying configurations of the porcelain part 1. Additionally, track guides 41 are provided atop the adjustable rails 40, and by means of screws or other slotted or threaded members, cooperate with the underlying track rail supports 42 to adjust the positions of the rails 40 to accommodate the porcelain part 1. Here again it will be seen that the cross-section of the porcelain part 1 varies between top to bottom, and thus the desirability of angling the supply feeder beam 25 as shown particularly in FIGS. 1 and 3.

The method of control presupposes that the linear feeder 10 is the master, and the supply feeder 20 is the slave. As set forth above, the linear feeder sensor beam 17, when interrupted, stops the linear feeder 10. Conversely, when the part 1 has been removed and fitted into one of the buckets 32, the beam 17 is then uninterrupted and the linear feeder 10 again activated. As will be observed in FIG. 1, the parts are in standard orientation, and not crowded in edge to edge contact. This configuration of the flow along the vibratory linear feeder 10 is quite important to prevent breakage, jamming, and the missing of parts by the buckets 32.

Figure 5:
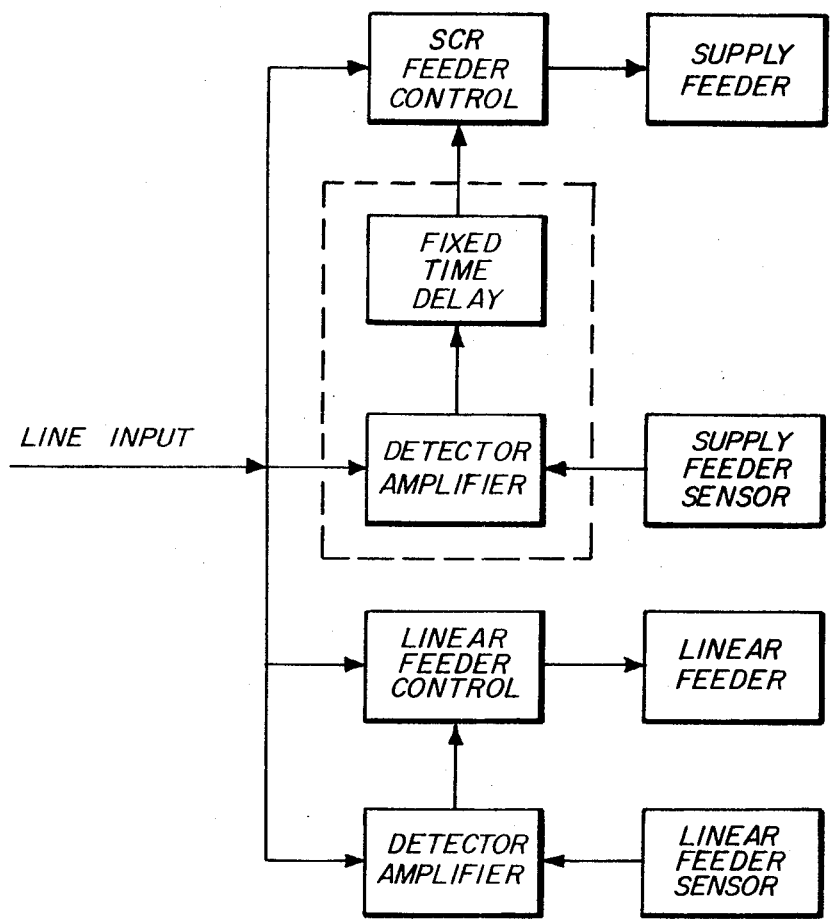
FIG. 5 is a diagrammatic view of the control circuit.

The spacing is accomplished by the time of the supply feeder beam 25 activation of the supply feeder bowl 20. This is achieved through a time delay sequence circuit as shown in FIG. 5, the sequence being as follows:

1. Upon the absence of parts sensed by the supply feeder beam 25, such as the gap shown at the right hand portion of the linear feeder 10 atop the rails 12 in FIG. 1, the supply feeder 20 is then activated.
2. When the supply feeder beam 25 senses a blockage again, a time delay of one or two seconds is set off so that a few parts will pass the supply feeder beam 25 before the supply feeder is again deactivated.
3. After the given time delay, the supply feeder beam circuit automatically shuts off the supply feeder 20 irrespective of whether parts are present or not interrupting the supply feeder beam 25.
4. If parts are absent, of course, the supply feeder 20 will be immediately reactivated due to a non-blockage of the supply feeder beam 25.
5. On the other hand, if parts are present, the supply feeder will remain inactive until the supply feeder beam 25 is again unbroken, and the supply feeder 20 activated.

As shown in FIG. 3, as pointed out above, it is considered desirable to position the supply feeder beam 25 at an acute angle with the longitudinal axis of the feeder 12, both from a standpoint of assuring additional space, and providing for positive blockage of the supply feeder beam 25 for sensing.

Although particular embodiments of the invention have been shown and described in full here, there is no intention to thereby limit the invention to the details of such embodiments. On the contrary, the intention is to cover all modifications., alternatives, embodiments, usages and equivalents of a feeder control and method as fall within the spirit and scope of the invention, specification and the appended claims.

What is claimed is:

1. A feeder control comprising, in combination
   a supply feeder tooled for delivering parts one at a time,
   an uninterrupted linear feeder tooled for receiving the said parts delivered one at a time from the supply feeder,
   a control mechanism involving two interrupted beams, one a linear feeder beam sensor and one a supply feeder beam sensor,
   means coupling the two said beam sensors to activate the supply feeder as a slave and the linear feeder as a master,
   said linear feeder beam sensor being positioned at the delivery end of the linear feeder and set to activate the linear feeder based upon the absence of blockage and deactivate the linear feeder based upon the presence of blockage by a single part,
   the supply feeder beam being positioned and set to activate the supply feeder upon the absence of a single part,
   a time delay device operatively connected to said supply feeder beam to deactivate the supply feeder a predetermined time delay after blockage occurs and position the supply feeder for reactivation after no further break of the beam occurs,
   and thereafter the supply feeder beam being conditioned for reactivation upon the absence of a part and the activation of the supply feeder thereupon.

2. In the feeder control of claim 1 above, orienting the supply feeder beam sensor at an acute angle with the linear feeder track axis to thereby be blind to gaps between parts attributable to narrower portions of the parts at the point where the axis of the beam is positioned.

3. In the control of claim 1,
   means for sighting at an acute angle said supply beam interruption activator along the input portion of the linear feeder to sense the presence or absence of parts,
   means for activating the supply feeder responsive to the absence of parts,
   and means for presetting a time delay to pass at least two parts before shut off of supply feeder due to the presence of parts sensed by the beam interruption activator.

4. In the control of claim 1,
   said supply feeder being a vibratory bowl feeder,
   said linear feeder being a vibratory linear feeder.

5. In the control of claim 2,
   said supply feeder being a vibratory bowl feeder,
   said linear feeder being a vibratory linear feeder.

6. In the control of claim 3,
   said supply feeder being a vibratory bowl feeder,
   said linear feeder being a vibratory linear feeder.

7. A method of controlling the feeding of individual parts oriented for delivery one at a time to transfer means to receive such parts singly from a linear feeder which in turn receives single oriented parts from a slaved supply feeder comprising the steps of
   feeding the parts one at a time to the linear feeder from the slaved supply feeder,
   delaying the shutting off the slaved supply feeder for a predetermined time after a signal,
   said signal being a function of continuous parts blockage of a sensor at the receiving part of the linear feeder,
   activating the slaved supply feeder responsive to the absence of parts blockage of the sensor at the receiving part of the linear feeder,
   deactivating the linear feeder responsive to one part at its delivery end, and reactivating the linear feeder upon the removal of a part at its delivery end.

8. In the method of claim 7,
   reactivating the supply feeder responsive to the absence of a part at a discreet position at the infeed portion of the linear feeder,
   delaying the deactivation of the supply feeder a predetermined time lag after first part has passed the discreet position,
   thereafter deactivating the supply feeder responsive to the presence of a part at the discreet position, thereby sending at least a pair of parts onto the linear feeder after the supply feeder is activated.

9. In the method of claim 7,
   sighting at an acute angle a beam interruption activator along the input portion of the linear feeder to sense the presence or absence of parts,
   activating the supply feeder responsive to the absence of parts,
   and presetting a time delay to pass at least two parts before shut off of the supply feeder due to the presence of parts sensed by the beam interruption activator.

10. In the method of claim 8,
    sighting at an acute angle a beam interruption activator along the input portion of the linear feeder to sense the presence or absence of parts,
    activating the supply feeder responsive to the absence of parts, and presetting a time delay to pass at least two parts before shut off of the supply feeder due to the presence of parts sensed by the beam interruption activator.

* * * * *